United States Patent [19]
Teng et al.

[11] 3,940,384
[45] Feb. 24, 1976

[54] METHYL HYDROXYPROPYL CELLULOSE ACETATE AND PROCESS

[75] Inventors: James Teng; Frank Dai; Marcella C. Stubits, all of St. Louis, Mo.

[73] Assignee: Anheuser-Busch, Incorporated, St. Louis, Mo.

[22] Filed: Aug. 13, 1973

[21] Appl. No.: 387,894

[52] U.S. Cl. ............... 260/226; 106/170; 106/183; 106/186; 106/187; 106/189; 106/190; 106/191; 252/316
[51] Int. Cl.² ........................................ C08B 13/00
[58] Field of Search ................................. 260/226

[56] References Cited
UNITED STATES PATENTS

| | | | |
|---|---|---|---|
| 2,055,892 | 9/1936 | Dreyfus | 260/226 |
| 3,322,130 | 5/1967 | Panzer et al. | 131/17 |
| 3,435,027 | 3/1969 | Desmarais et al. | 260/226 |
| 3,870,701 | 3/1975 | Teng et al. | 260/226 |

*Primary Examiner*—Ronald W. Griffin
*Attorney, Agent, or Firm*—Gravely, Lieder & Woodruff

[57] ABSTRACT

This disclosure involves the acetate ester of methyl hydroxypropyl cellulose. This particular cellulose ester is useful as a gelling agent for organic solvents. The methyl hydroxypropyl cellulose acetate is prepared by the simultaneous hydroxypropylation and methylation of cellulose and by the continuation of the cellulose derivatization into acetylation. The overlapping relationship of the hydroxypropylation and acetylation processes is found to be efficient and economical in that it eliminates the difficulty of isolation and recovery of the water insoluble methyl hydroxypropyl cellulose.

10 Claims, No Drawings

METHYL HYDROXYPROPYL CELLULOSE ACETATE AND PROCESS

BACKGROUND OF THE INVENTION

In a wide variety of applications there exists the need for a product which will thicken or gel organic based formulations. To meet this need, several gelling agents for organic solvents are available on the market. These generally include colloidal particles (such as silica), metallic soaps (aluminum soap), and cellulose derivatives that require polar cosolvents.

In co-pending application Ser. No. 222,660, entitled ESTERS OF POLYMERIC HYDROXYPROPYL CARBOHYDRATES AND METHOD OF USING SAME AS GELLING AGENT FOR ORGANIC SOLVENTS, filed on Feb. 1, 1972 and assigned to the assignee of the present invention, now U.S. Pat. No. 3,824,085, issued July 16, 1974, there is described and claimed a gelling agent and process for making same. The process of said co-pending application involves the use of hydroxypropyl cellulose and starch esters, specifically the acetate and laurate esters. The process is quite satisfactory and the hydroxypropyl carbohydrate esters are capable of gelling a large number of organic solvents.

In accordance with the present invention a new composition and process has been discovered which comprises the hydroxypropylation, methylation and acetylation of cellulose in one continuous process to produce methyl hydroxypropyl cellulose acetate, a water insoluble gelling agent for organic solvents. More specifically, the process of this invention involves the simultaneous hydroxypropylation and methylation of cellulose with the continued derivatization of cellulose into acetate. The commencement of the acetylation process prior to the cessation of the hydroxypropylation process eliminates the isolation and recovery of the methyl hydroxypropyl cellulose. As a result, the product is formed in one continuous process.

The preparation of this new polymeric carbohydrate derivative is economical, based on both material and processing costs. The reactions are run under mild conditions, with only a closed reaction vessel required.

Thus, one of the principal objects of the present invention is to provide a new polymeric carbohydrate derivative capable of gelling organic solvents. Another principal object of this invention is to provide a gelling agent for organic solvents that is water insoluble. Still another object is to provide a method of making a gelled organic solvent from methyl hydroxypropyl cellulose acetate. Another object is to provide a method of making an improved gelling agent for organic solvents by the simultaneous hydroxypropylation and methylation of cellulose and continuing the cellulose derivatization by acetylation. Other objects and advantages will become apparent hereinafter.

Gelling of volatile chemicals retards the rate of vaporization allowing only a slow release of vapor. The gelling agent of the present invention is useful in many applications, some of which include gelling jet fuel, soil fumigants, herbicides, paint stripping formulations and cleaning solvents. Some of the organic solvents which the methyl hydroxypropyl cellulose acetate of this invention is capable of gelling include: carbon tetrachloride, toluene, acetonitrile ethylacetate, methyl ethyl ketone, dioxane, dimethyl sulfoxide, dimethyl formamide, pyridine, and benzyl alcohol.

SUMMARY OF THE INVENTION

This invention comprises a water insoluble polymeric carbohydrate derivative, methyl hydroxypropyl cellulose acetate, which is capable of gelling a broad range of organic solvents, and the process of making the same.

DETAILED DESCRIPTION

The product of this invention is a mixed ether ester capable of thickening or gelling a wide variety of solvents. This polymeric gelling agent provides many desirable properties which are lacking in the presently available gelling agents. It is insoluble in water, soluble in organic solvents and is inert, non-ionic and non-hygroscopic. It is easy to handle, creating no dust or bulk problem and no special equipment, such as homogenizers, are needed for dissolution. Solutions and gels may be easily prepared by adding the gelling agent to an organic solvent under high speed agitation. After mixing, the mixture is allowed to stand for about one to ten minutes to complete gelation or thickening. The gel which is formed has a long shelf life, developing no syneresis, and is stable to temperature changes and vibrational influences. The gel has a smooth elastic body but not to the point of excessive stringiness. The thickened solutions exhibit thixotropic or pseudo-plastic properties at low concentrations. This facilitates handling of the thickened solutions in pumping and mixing. Gels can usually be formed at concentrations below 1.5% of gelling agent. The present gelling agent is soluble in a wide range of organic solvents and is an effective thickener or gellant at low concentrations.

Examples of solvents which are capable of being gelled with methyl hydroxypropyl cellulose acetate are seen in Table I. These organic solvents may be esters, ketones, aromatic ring ethers, nitrites, amides, alcohols or halogenated solvents with a solubility parameter of about 8 to about 12.

The solubility parameter is a method of measuring gelling ability of the methyl hydroxypropyl cellulose acetate and is set forth in *Polymer Handbook* edited by E. H. Immergut, Interscience Publishers (1966). Solubility parameter or $\delta$ is a thermodynamic property of solvents and may be used to measure their mutural compatibility. For example, two solvents with the same $\delta$ value will be miscible and a solute with the same $\delta$ value will be soluble in both, regardless of the nature of the solvents. Once the $\delta$ value for a given polymer is determined by dissolution in a few solvents, all other solvents with comparable $\delta$ values will also dissolve it.

The term solubility as used in this context has a somewhat different meaning than it conventionally has. Solubility is used generally to indicate the extent of interaction between a solid and a solvent. A piece of solid, when placed in a solvent, will dissolve into the solvent until the saturation point is reached. At that point, the two phases, solid and liquid coexist at equilibrium. The amount of solute in liquid is measured as the solubility of the material in solution. However, there is no such saturation point in the case of the gelling agents of this invention. When immersed in a "compatible" solvent, the gelling agents swell and dissolve. As more and more gelling agent is added, the material will continue to swell and dissolve. When there is insufficient solvent to disassociate completely the polymers, then swelling only occurs. A single phase (solution or gel) is reached at all times. To examine qualitatively the compatibility of a gelling agent, 5 g. of gelling agent is placed in 100 ml. of solvent. It is compatible if only one phase is observed (gel or solution). It is incompatible when the mixture retains two phases.

Table I shows examples of solvents with their corresponding solubility parameter. The methyl hydroxypropyl cellulose acetate gels solvents with a solubility parameter of about 8-12.

TABLE I

| SOLVENTS | SOLUBILITY PARAMETER |
|---|---|
| Isoamylacetate | 7.8 |
| Ethyl acetate | 8.4 |
| Carbon tetrachloride | 8.4 |
| Toluene | 8.9 |
| Methyl ethyl ketone | 9.3 |
| Methylene chloride | 9.7 |
| Dioxane | 10.0 |
| Pyridine | 10.3 |
| Acetonitrile | 11.5 |
| Dimethyl sulfoxide | 12.0 |
| Dimethyl formamide | 12.1 |
| Benzyl alcohol | 12.1 |

The product of this invention is chemically distinct from the product of application Ser. No. 222,660 even though they possess similar properties.

The methyl hydroxypropyl cellulose acetate of this invention has a D.S. of about 0.1 to about 1.0 methyl group, preferably about 0.1 to about 0.5; a D.S. of about 0.8 to about 2.5 acetyl groups, preferably about 1 to about 2; and an M.S. of about 2 to about 8 hydroxypropyl groups, preferably about 3.5 to about 4.5.

The purpose of the following paragraph is to explain the use herein of the term "degree of substitution" (D.S.) and degree of molar substitution (M.S.).

The degree of substitution is defined as the average number of hydroxyl groups substituted per anhydroglucose unit. The maximum number of hydroxyl groups per anhydroglucose is three and therefore the theoretical maximum degree of substitution is also three in the case of monofunctional substituents.

In the case of polyfunctional or polymerizable substituents that can react not only with the hydroxyl groups but also with themselves, the number of substituents is no longer limited by the three available hydroxyl groups on the anhydroglucose unit. The term "degree of molar substitution", (M.S.) is adopted and defined simply as the number of moles of substituent per anhydroglucose unit. There is no theoretical maximum value for the degree of molar substitution, (M.S.).

The amount of polymeric carbohydrate derivative used as a gelling agent is at least about 0.3 grams per 100 ml. of solvent and may be as much as 5 grams per 100 ml. depending upon the desired gel viscosity.

Gels and thickened solutions may be easily prepared by adding the methyl hydroxypropyl cellulose acetate to the solvent under high speed agitation. Heat may be used to speed dissolution. The final gel has a specific gravity substantially that of the solvent being gelled.

The preferred process for making the composition of this invention involves the simultaneous hydroxypropylation and methylation of cellulose with the continued derivatization of cellulose into the acetate ester. Each of these steps may be done independently of each other if desired. That is, the hydroxypropyl cellulose may be obtained from a commercial source and then subjected to the methylation and acetylation procedures.

SPECIFIC EXAMPLES

Following are specific examples showing the method of making methyl hydroxypropyl cellulose acetate and its application in gelling organic solvents.

EXAMPLE NO. 1

The following reactants are placed in a reactor with stirring for 45 minutes at 15° to 30°C.

| cellulose | 40 g. |
| sodium hydroxide | 8 g. |
| toluene | 470 ml. |
| water | 16 g. |

At the end of the prescribed time, approximately 130 g. of propylene oxide and 5 g. methyl chloride are added to the reactor, the air being displaced from the vessel with nitrogen. The reactor is heated at 60°C. for 1 hour. Thereafter, the temperature is slowly raised to 95°C. over a period of 5 hours.

At the end of this period the reaction is substantially complete. The reactor is cooled to room temperature and the toluene solvent is decanted.

Next, approximately 500 ml. hexane, 120 ml. acetic anhydride and about 120 ml. of a 1:1 (v/v) trimethylamine hexane solution are added to the reactor with stirring for 30 minutes at room temperature.

The final reaction mixture is washed with an aqueous solution of sodium bicarbonate solution and water, then filtered and dried. The methyl hydroxypropyl cellulose acetate is recovered as a white solid.

EXAMPLE NO. 2

This example employs the same conditions as Example No. 1. The primary difference from Example No. 1 is in allowing the toluene to remain in the crude methyl hydroxypropyl cellulose and serve as a solvent during the acetylation. After the acetylation with acetic anhydride, methyl hydroxypropyl cellulose acetate is precipitated by adding 500 ml. hexane and then purified by aqueous sodium bicarbonate solution washing and water washing.

EXAMPLE NO. 3

This example is performed under the same condition as Example No. 1, except that pyridine is used as a catalyst during the acetylation. The crude methyl hydroxypropyl cellulose is treated with 110 ml. of acetic anhydride and 62 g. of pyridine in 500 ml. of hexane. The reaction temperature is kept at 25°C. for 2 hours. The methyl hydroxypropyl cellulose acetate is recovered and has the same properties as the acetate in Example No. 1.

EXAMPLE NO. 4

A slurry of 40 g. of cellulose is mixed with agitation in 24 g. of 33% aqueous sodium hydroxide solution and 480 g. of hexane mixture in a closed reactor provided with a mechanical stirrer. Air in the reactor is displaced with nitrogen. The mixture is agitated over a period of about 45 minutes at 4°-10°C. At this point, 136 g. of propylene oxide and 6.7 g. of methyl chloride are added, the air being displaced from the reactor with nitrogen. The resulting charge is then raised to a temperature of about 60°C. and held at this temperature for one hour, then 75°C. for 3 hours, and 85°C. for 6 hours. At this stage, the reaction mixture contains a slurry of crude methyl hydroxypropyl cellulose.

The crude methyl hydroxypropyl cellulose is then treated with 120 ml. of acetic anhydride and 120 ml. of hexane trimethylamine (1:1 v/v) and allowed to react with stirring at room temperature for approximately ½ hour.

After the reaction, the hexane is removed by filtration. The reaction product is washed with 500 ml. of 4% aqueous sodium bicarbonate solution. The product, methyl hydroxypropyl cellulose acetate, is substantially completely soluble in carbon tetrachloride, toluene, acetonitrile, ethyl acetate, methyl ethyl ketone, dioxane, dimethylsulfoxide, dimethylformamide, pyridine, and benzyl alcohol to form smooth solutions. The Brookfield viscosity (spindle No. 3 at 10 rpm) of a 1% dimethylformamide solution at room temperature is 2300 cps.

The methyl hydroxypropyl cellulose acetate is capable of gelling organic solvents with a solubility parameter of about 8 to about 12.

EXAMPLE NO. 5

A slurry of 40 g. of cellulose is added to 400 ml. of 7% aqueous sodium hydroxide solution and stirred for 1 hour at 0°–5°C. Then the excess alkali solution is removed by vacuum filtration using a rubber sheet over the filter to prevent air from passing through the cake, leaving a filter cake weighing 162.5 g. which has an alkali/cellulose ratio of 0.31 and a water/cellulose ratio of 2.3.

This alkali cellulose cake is broken up and placed in the reaction vessel along with 400 g. of toluene and 6 g. of methyl chloride, the air being displaced from the vessel with nitrogen. After the mixture has been stirred for ½ hour at room temperature, 800 g. of propylene oxide is added to the reactor. The vessel is then heated gently to 65°–75°C. and held at this temperature for about 6 hours. At this stage, the vessel is cooled to room temperature, the toluene solvent and the unreacted propylene oxide are filtered off. The reaction mixture is neutralized with 85% $H_3PO_4$. The product, methyl hydroxypropyl cellulose, is purified by washing with hot water and then dried at 70°C. under vacuum.

This pure methyl hydroxypropyl cellulose is then acetylated with 58 ml. of acetic anhydride and 20 g. of trimethylamine in 350 ml. of hexane. The resulting charge is allowed to react for ½ hour with agitation at room temperature. The product is purified by washing with aqueous sodium bicarbonate solution and water. A methyl hydroxypropyl cellulose acetate is obtained which has the same solubility in various organic solvents as the acetate made from Example No. 1.

EXAMPLE NO. 6

Cellulose in sheet form weighing 39.8 g. is steeped in 12% sodium hydroxide for 20 minutes and then pressed at 5000 psi to obtain a press weight ratio of 1.91. The pressed cake has an alkali/cellulose ratio of 0.16 and a water/cellulose ratio of 0.87 (bone dry cellulose basis).

The alkali cellulose cake is broken up and placed in the reaction vessel with 500 ml. toluene, 6 g. methyl chloride, plus 175 g. propylene oxide, the air being displaced from the vessel with nitrogen. The vessel is then heated to 65° to 75°C. and held at this temperature for 6 hours. The vessel is then cooled to room temperature, and the excess solvent filtered off. The acetylation is carried out by reacting the crude methyl hydroxypropyl cellulose with 200 g. of acetic anhydride and 60 g. of trimethylamine in 600 ml. hexane for 1 hour at 25°C. The acetate has the same properties as the acetate made in Example No. 1.

What is claimed is:

1. The compound methyl hydroxypropyl cellulose acetate having a degree of molar substitution of hydroxypropyl groups of about 2 to about 8, a degree of substitution of methyl groups of about 0.1 to about 1, and a degree of substitution of acetyl groups of about 0.8 to about 2.5, and further characterized by being soluble in organic solvents and insoluble in water.

2. The process of preparing methyl hdyroxypropyl cellulose acetate which comprises the hydroxypropylation and methylation of cellulose under conditions of temperature and time such that a degree of molar substitution of hydroxypropyl groups of about 2 to 8 and a degree of substitution of methyl groups of about 0.1 to about 1 is produced, and acetylation of the cellulose to a degree of substitution of acetyl groups of about 0.8 to about 2.5, said methyl hydroxypropyl cellulose acetate being characterized by being soluble in organic solvents having a solubility parameter of about 8 to about 12 and being insoluble in water.

3. The process of claim 2 wherein propylene oxide is the hydroxyalkylation reagent.

4. The process of claim 2 wherein methyl chloride is the methylation reagent.

5. The process of claim 2 wherein acetic anhydride is the acetylation reagent.

6. The process of claim 2 wherein the steps of hydroxypropylation and methylation occur simultaneously and the acetylation process commences prior to the ending of the simultaneous hydroxypropylation and methylation of the cellulose.

7. The process or preparing methyl hydroxypropyl cellulose acetate comprising the steps of:

A. forming a filter cake of the cellulose with alkali,
B. dispensing the cake in a solvent,
C. adding a methylation reagent,
D. adding a hydroxypropylation reagent,
E. heating the mixture to a temperature and for a time sufficient to produce methyl hydroxypropyl cellulose having a degree of substitution of methyl groups of about 0.1 to about 1 and a degree of molar substitution of hydroxypropyl groups of about 2 to about 8,
F. adding acetic anhydride,
G. and recovering a methyl hydroxypropyl cellulose acetate having a degree of substitution of acetyl groups of about 0.8 to about 2.5.

8. The process of claim 7 wherein the solvent is an organic solvent having a solubility parameter of about 7.8 to about 12.

9. The process of claim 7 wherein the methylation reagent is methyl chloride.

10. The process of claim 7 wherein the hydroxypropylation reagent is propylene oxide.

* * * * *